United States Patent
Collins

(10) Patent No.: US 9,329,705 B2
(45) Date of Patent: May 3, 2016

(54) STYLUS WITH ASYMMETRIC ELECTRONIC CHARACTERISTICS

(71) Applicant: Richard Paul Collins, Southampton (GB)

(72) Inventor: Richard Paul Collins, Southampton (GB)

(73) Assignee: Atmel Corporation, San Jose, CA (US)

( * ) Notice: Subject to any disclaimer, the term of this patent is extended or adjusted under 35 U.S.C. 154(b) by 231 days.

(21) Appl. No.: 14/073,417

(22) Filed: Nov. 6, 2013

(65) Prior Publication Data

US 2015/0123932 A1    May 7, 2015

(51) Int. Cl.
*G06F 3/0354* (2013.01)
*G06F 3/045* (2006.01)
*G06F 3/044* (2006.01)

(52) U.S. Cl.
CPC ............ *G06F 3/03545* (2013.01); *G06F 3/044* (2013.01); *G06F 3/045* (2013.01); *G06F 2203/04108* (2013.01)

(58) Field of Classification Search
CPC ... G06F 3/033; G06F 3/0354; G06F 3/03545; G06F 2203/04101; G06F 3/0317; G06F 3/03542; G06F 3/0386; G06F 3/044; G06F 3/045; G06F 3/046
See application file for complete search history.

(56) References Cited

U.S. PATENT DOCUMENTS

| | | |
|---|---|---|
| 7,663,607 B2 | 2/2010 | Hotelling |
| 7,864,503 B2 | 1/2011 | Chang |
| 7,875,814 B2 | 1/2011 | Chen |
| 7,920,129 B2 | 4/2011 | Hotelling |
| 8,031,094 B2 | 10/2011 | Hotelling |
| 8,031,174 B2 | 10/2011 | Hamblin |
| 8,040,326 B2 | 10/2011 | Hotelling |
| 8,049,732 B2 | 11/2011 | Hotelling |
| 8,179,381 B2 | 5/2012 | Frey |
| 8,217,902 B2 | 7/2012 | Chang |
| 2008/0309635 A1 | 12/2008 | Matsuo |
| 2009/0315854 A1 | 12/2009 | Matsuo |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2013/0076612 A1 | 3/2013 | Myers |

(Continued)

FOREIGN PATENT DOCUMENTS

WO   WO 2012/129247 A2   9/2012

OTHER PUBLICATIONS

U.S. Appl. No. 61/454,936, filed Mar. 21, 2011, Myers.

(Continued)

*Primary Examiner* — Premal Patel
(74) *Attorney, Agent, or Firm* — Baker Botts L.L.P.

(57) ABSTRACT

In one embodiment, a first device includes an electrically conductive element that is configured to capacitively couple to an electrode of a second device emitting a first electrical signal. The electrically conductive element is further configured to communicate to a circuit of the first device a second electrical signal induced in the electrically conductive element by the first electrical signal and through the capacitive coupling. The circuit of the first device is coupled to the electrically conductive element and is configured to receive the second electrical signal. The circuit is further configured to produce an electrical response to the second electrical signal, where the electrical response of the circuit is based at least in part on one or more characteristics of the first electrical signal.

20 Claims, 6 Drawing Sheets

(56) References Cited

U.S. PATENT DOCUMENTS

| | | | |
|---|---|---|---|
| 2013/0145856 A1* | 6/2013 | Sasajima | 73/774 |
| 2013/0335381 A1* | 12/2013 | Laurienzo et al. | 345/179 |
| 2014/0043283 A1* | 2/2014 | Kim | 345/174 |
| 2014/0152582 A1* | 6/2014 | Agarwal et al. | 345/173 |

OTHER PUBLICATIONS

U.S. Appl. No. 61/454,950, filed Mar. 21, 2011, Lynch
U.S. Appl. No. 61/454,894, filed Mar. 21, 2011, Rothkopf.

* cited by examiner

STYLUS WITH ASYMMETRIC ELECTRONIC CHARACTERISTICS

TECHNICAL FIELD

This disclosure generally relates to styluses that have asymmetric electronic characteristics.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

DESCRIPTION OF EXAMPLE EMBODIMENTS

Figure 1:
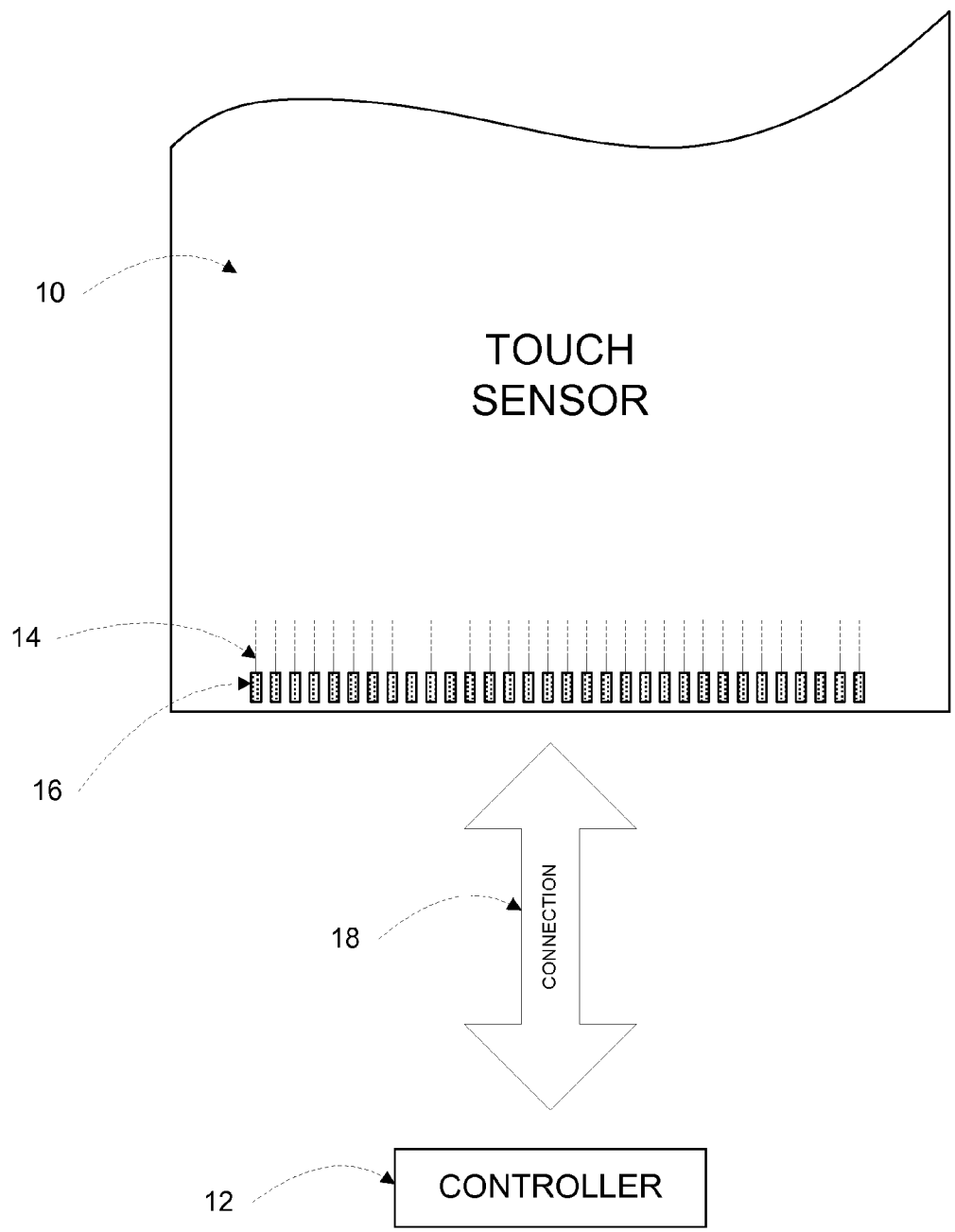
FIG. 1 illustrates an example touch sensor with an example touch-sensor controller.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. This disclosure contemplates any suitable electrodes made of any suitable material.

Touch sensor 10 may implement a capacitive form of touch sensing and may be referred to as a capacitive touch sensor. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space, or gap, between them. A pulsed or alternating voltage applied to the drive electrode (by touch-sensor controller 12) may induce a charge on the sense electrode, and the amount of charge induced may be susceptible to external influence. External influence may arise from a touch or the proximity of an object, such as for example a finger or a stylus. When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such as one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 µm or less. As another example, the conductive material of tracks 14 may be silver or silver-based and have a width of approximately 100 µm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2:
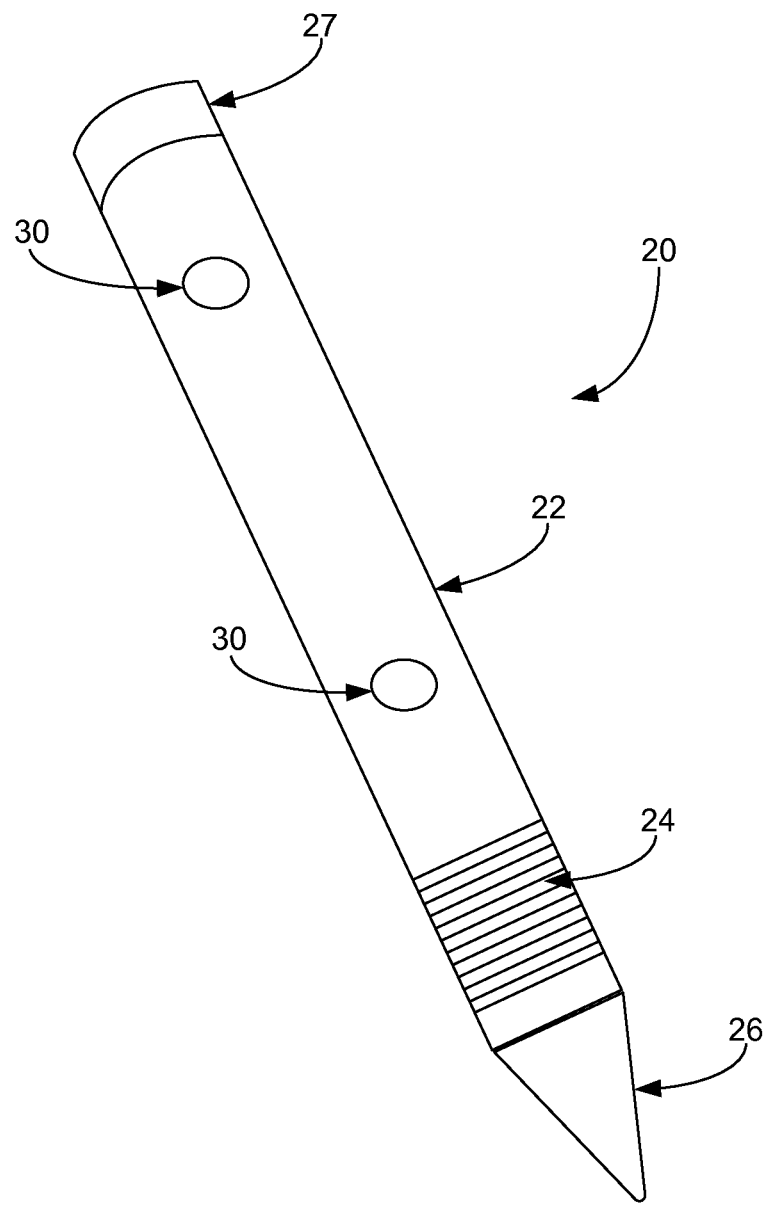
FIG. 2 illustrates an example stylus exterior.

FIG. 2 illustrates an example exterior of an example stylus 20, which may be used in conjunction with touch sensor 10 of FIG. 1. Stylus 20 may have any suitable dimensions with outer body 22 made of any suitable material or combination of materials, such as, for example and without limitation, plastic or metal. In particular embodiments, a touch sensor (e.g., touch sensor 10 illustrated in FIG. 1) may detect the presence and location of stylus 20 or a part of stylus 20. In particular embodiments, touch sensor 10 may be part of any suitable device, such as, for example and without limitation, a desktop computer, laptop computer, tablet computer, personal digital assistant (PDA), smartphone, satellite navigation device, portable media player, portable game console, kiosk computer, point-of-sale device, or other suitable device. Stylus 20 may have one or more components or features configured to provide tactile feedback to a user. Stylus 20 may include one or more ridges or grooves 24 on its outer body 22. Ridges or grooves 24 may have any suitable dimensions, have any suitable spacing between ridges or grooves, or be located at any suitable area on outer body 22 of stylus 20. As an example and not by way of limitation, ridges 24 may enhance a user's grip on outer body 22 of stylus 20.

Stylus 20 may include one or more components, such as buttons or switches 30, integrated with outer body 22. As an example and not by way of limitation, buttons or switches 30 may include a mechanical button or mechanical switch, such as for example a momentary mechanical pushbutton switch or a mechanical latching switch. These external components may provide for configuring, altering, or modifying the electronic characteristics or functionality of stylus 20 in a way that may be detectable by touch sensor 10. In particular embodiments, exterior components (e.g., buttons or switches 30) of stylus 20 may interact with or be coupled to internal components of stylus 20. As an example and not by way of limitation, a switch 30 may be coupled to an electrical circuit located inside stylus 20. Although this disclosure provides specific examples of particular components configured to provide a particular configuration of stylus 20, this disclosure contemplates any suitable component configured to provide any suitable configuration.

In particular embodiments, stylus 20 may be referred to as a passive stylus, where passive stylus may refer to a stylus having no internal power source, such as for example a built-in primary battery or a rechargeable battery. In particular embodiments, stylus 20 may include one or more electronic circuit elements, such as for example resistors, inductors, capacitors, switches, diodes, transistors, or any suitable combination of such circuit elements. In particular embodiments, stylus 20 may include one or more electronic circuit elements and may be referred to as a passive stylus since stylus 20 may not include an internal power source.

As illustrated in FIG. 2, stylus 20 may have a tip 26 located at an end of stylus 20. In particular embodiments, stylus 20 may have a tip 26 located at one end and a cap 27 located at an end opposite tip 26. In particular embodiments, stylus 20 may have a substantially elongated shape with two ends, where tip 26 may refer to one end of stylus 20, and cap 27 may refer to the other end of stylus 20. In particular embodiments, tip 26 or cap 27 may have a terminal end, surface, or point that makes contact with or interacts with touch sensor 10. In particular embodiments, tip 26 or cap 27 may have a terminal end, or nib, with a tapered or rounded shape. In particular embodiments, tip 26 or cap 27 may have any suitable dimensions, such as, for example, a diameter of 4 mm or less at its terminal end. In particular embodiments, tip 26 or cap 27 may have a terminal end that forms a substantially sharp or pointed end. In particular embodiments, tip 26 or cap 27 may have a terminal end that forms a substantially blunt or flat end. In particular embodiments, tip 26 and cap 27 of stylus 20 may have shapes that are substantially the same or similar. As an example and not by way of limitation, tip 26 and cap 27 may both have a substantially pointed end. As another example, tip 26 and cap 27 may both have a substantially blunt or flat end. In particular embodiments, tip 26 and cap 27 may each have different shapes. In the example of FIG. 2, tip 26 has a substantially tapered shape with a substantially pointed end, and cap 27 has a substantially blunt or flat end. Although this disclosure describes and illustrates particular styluses with particular tips and caps having particular shapes, this disclosure contemplates any suitable styluses with any suitable tips or caps having any suitable shapes.

In particular embodiments, tip 26 or cap 27 may include one or more materials, such as for example an electrically conductive material, an electrically resistive (or, partially electrically conductive) material, an electrically insulating (or, non-conductive) material, or any suitable combination of conductive, resistive, or insulating materials. In particular embodiments, all or part of tip 26 or cap 27 may be made of an electrically conductive material, such as for example aluminum, copper, or any suitable conductive metal; a conductive form of plastic or rubber (e.g., a plastic or rubber material combined with metal particles or electrically conductive carbon particles); or any other suitable conductive material. In particular embodiments, all or part of tip 26 or cap 27 may be made of a resistive material, such as for example a partially conductive form of plastic, rubber, or ceramic. In particular embodiments, all or part of tip 26 or cap 27 may be made of an electrically insulating material, such as for example an insulating plastic or rubber material. In particular embodiments, all or part of tip 26 or cap 27 may be made from a material that changes electrical resistance as a force is applied to the material, such as for example a rubber material containing an electrically conductive material (e.g., a metal or a conductive form of carbon). Although this disclosure describes and illustrates particular tips 26 and caps 27 made of particular materials, this disclosure contemplates any suitable tips 26 and caps 27 made of any suitable materials.

In particular embodiments, tip 26 or cap 27 may include two or more parts or regions, where each of the parts or regions is made of a different material. As an example and not by way of limitation, tip 26 or cap 27 may include a portion made of an electrically conductive material and another portion made of an electrically insulating material. As another example, tip 26 or cap 27 may include a portion made of an electrically resistive material and another portion made of an electrically insulating material. In particular embodiments, tip 26 or cap 27 may include an electrically resistive or conductive portion that is coupled to an electrical circuit located inside tip 26 or cap 27. In particular embodiments, tip 26 or cap 27 may be formed from electrically conductive material, resistive material, or insulating material, or any suitable combination of such suitable materials. Although this disclosure describes and illustrates particular tips 26 and caps 27 made of particular numbers and types of materials, this disclosure contemplates any suitable tips 26 and caps 27 made of any suitable numbers of materials and any suitable types of materials.

Stylus 20 may receive or encounter signals from external sources, including a device, a user, or a touch sensor. As examples and not by way of limitation, signals received or encountered by stylus 20 may include noise (e.g., noise from a device or noise from other external sources), a signal associated with a pulsed or alternating voltage applied to touch sensor 10 drive electrode, or an electrostatic discharge (ESD). In particular embodiments, a signal received by stylus 20 may be filtered by any suitable filter, such as for example an inductive or capacitive filter. As an example and not by way of limitation, stylus 20 may include an input capacitor for filtering or reducing the amplitude of an electrostatic discharge (ESD) event. Although this disclosure describes and illustrates a particular configuration of particular components with particular locations, dimensions, composition, and functionality, this disclosure contemplates any suitable configuration of suitable components with any suitable locations, dimensions, composition, and functionality with respect to stylus 20.

Figure 3:
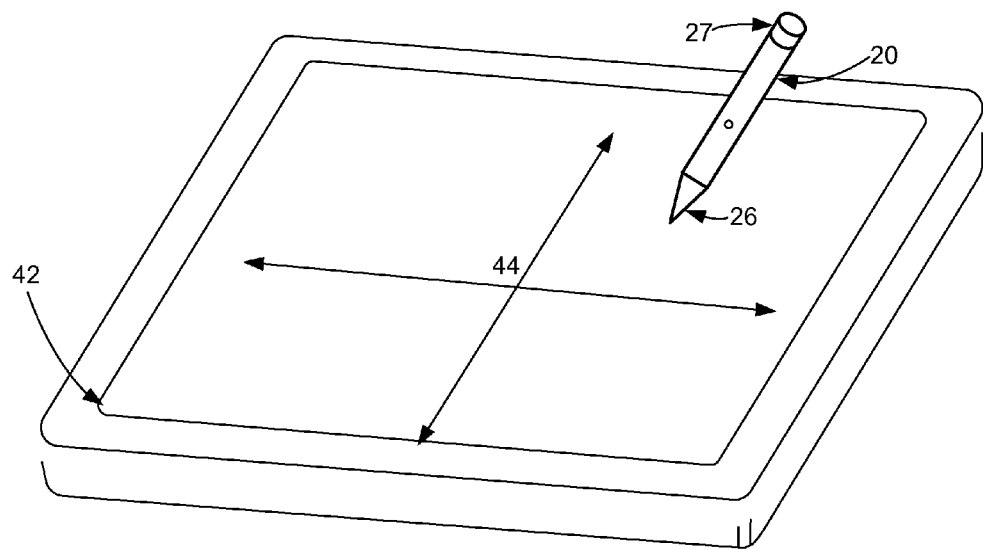
FIGS. 3-4 illustrate an example stylus with an example device.
Figure 4:
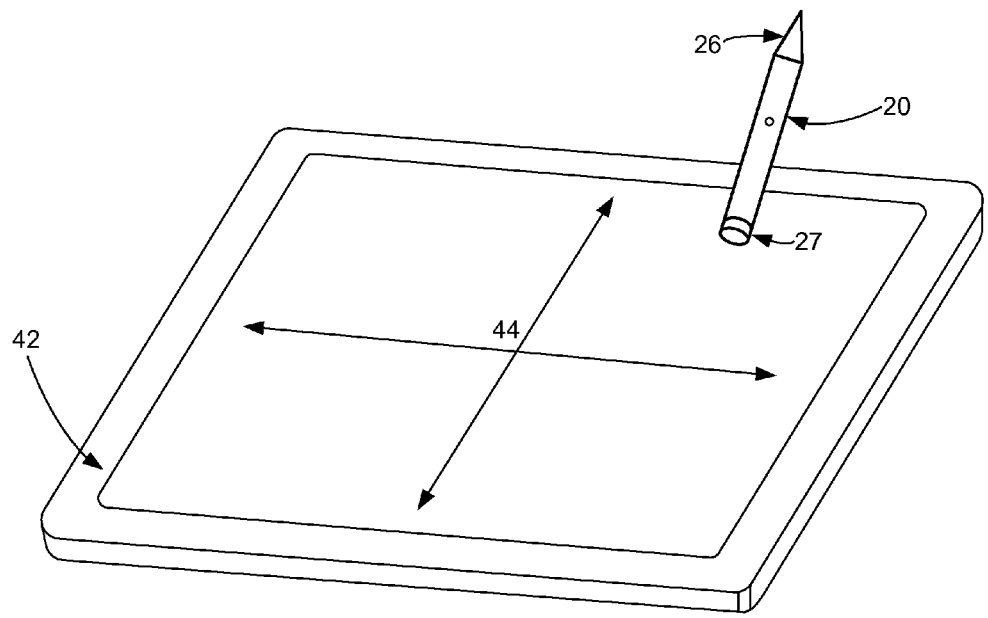

FIGS. 3 and 4 illustrate an example stylus 20 with an example device 42. One example of device 42 is touch screen 10 of FIG. 1. Device 42 may have a display (not shown) and a touch sensor with a touch-sensitive area 44. Device 42 display may be a liquid crystal display (LCD), a light-emitting diode (LED) display, a LED-backlight LCD, or other suitable display and may be visible though a cover panel and substrate (and the drive and sense electrodes of the touch sensor disposed on it) of device 42. Although this disclosure describes particular devices and particular display types, this disclosure contemplates any suitable devices and any suitable display types.

Device 42 electronics may provide the functionality of device 42. As an example and not by way of limitation, device 42 electronics may include circuitry or other electronics for wireless communication to or from device 42, executing programming on device 42, generating graphical or other user interfaces (UIs) for device 42 display to display to a user, managing power to device 42 from a battery or other power source, taking still pictures, recording video, other suitable functionality, or any suitable combination of these. Although this disclosure describes particular device electronics providing particular functionality of a particular device, this disclosure contemplates any suitable device electronics providing any suitable functionality of any suitable device.

Stylus 20 may interact with or affect device 42 when stylus 20 is brought in contact with or in proximity to touch-sensitive area 44 of the touch sensor of device 42. In particular embodiments, device 42 may detect the presence and location of tip 26 or cap 27 of stylus 20. In particular embodiments, interaction between stylus 20 and device 42 may be capacitive or inductive. Although this disclosure describes particular interactions between stylus 20 and device 42, this disclosure contemplates any suitable interactions through any suitable means, such as mechanical forces, current, voltage, or electromagnetic fields.

In the example of FIG. 3, stylus 20 is oriented with tip 26 close to or in contact with touch-sensitive area 44 of device 42. In the example of FIG. 4, stylus 20 is flipped relative to FIG. 3 so that stylus 20 is oriented with cap 27 close to or in contact with touch-sensitive area 44. In particular embodiments, tip 26 and cap 27 may be configured to have different electronic responses to a drive signal applied by device 42 to a drive electrode of touch-sensitive area 44. In particular embodiments, device 42 may be configured to distinguish between the different electronic responses provided by tip 26 and cap 27. In particular embodiments, stylus 20 may be configured so that device 42 can determine whether tip 26 or cap 27 is interacting with touch-sensitive area 44 of device 42. In particular embodiments, the function of stylus 20 or the interaction between stylus 20 and device 42 may change depending on whether tip 26 or cap 27 is interacting with touch-sensitive area 44. As an example and not by way of limitation, device 42 may be configured so that when tip 26 interacts with touch-sensitive area 44, stylus may write on or enter information into a display of device 42, and when cap 27 interacts with touch-sensitive area 44, stylus may erase or remove information from a display of device 42.

Figure 5:
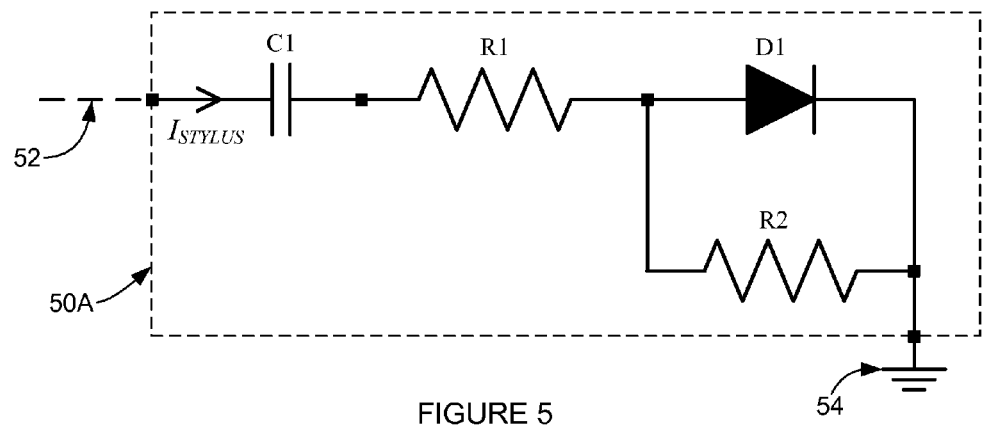
FIGS. 5-6 illustrate example asymmetric circuits for producing an asymmetric electronic response from a stylus.
Figure 6:
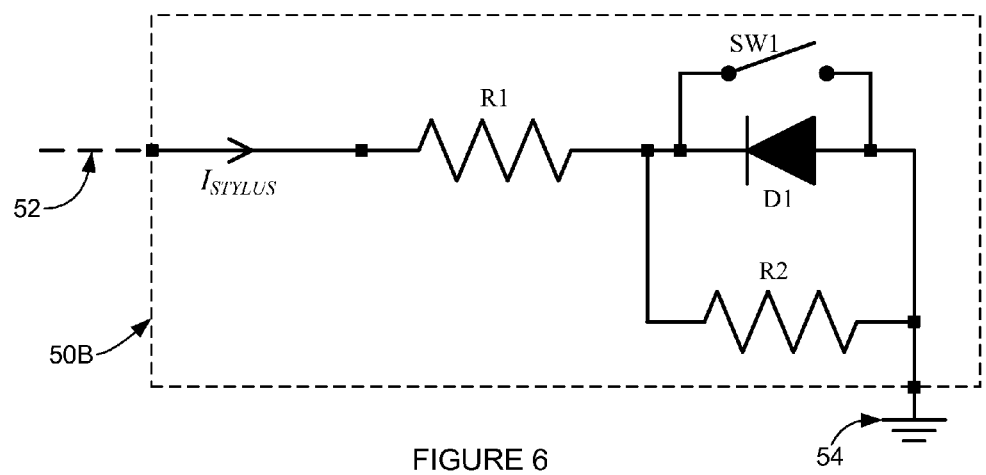

FIGS. 5 and 6 illustrate example asymmetric circuits 50 for producing an asymmetric electronic response from stylus 20. In particular embodiments, an asymmetric electronic response of circuit 50 may be referred to as an asymmetric electronic characteristic. In particular embodiments, all or a portion of circuit 50 may be located inside stylus 20, and circuit 50 may have a particular electronic response to a received signal associated with a drive signal applied by device 42 to a drive electrode of touch-sensitive area 44. In particular embodiments, an asymmetric electronic response may refer to circuit 50 having different behavior depending on the polarity of an input signal or the polarity of an associated drive signal. In particular embodiments, the polarity of a signal may refer to whether the signal has a rising (or positive) edge or a falling (or negative) edge. In particular embodiments, a rising edge of a signal may be referred to as a positive-polarity signal, and a falling edge of a signal may be referred to as a negative-polarity signal. As an example and not by way of limitation, an asymmetric electronic characteristic of circuit 50 may include circuit 50 having a polarity-dependent time constant, or a time constant that depends on the polarity of an input signal or the polarity of an associated drive signal. In particular embodiments, an asymmetric circuit 50 may exhibit a response to a signal that depends on the polarity of the signal (e.g., whether the signal has a rising edge or a falling edge). In particular embodiments, a time constant ($\tau$) may be determined from the product of a resistance (R) and capacitance (C) associated with circuit 50 and may be referred to as an RC time constant. As an example and not by way of limitation, a circuit 50 with a resistance of 1 M$\Omega$ and a capacitance of 5 pF has a time constant of $\tau = R \times C = (1\ M\Omega) \times (5\ pF) = 5\ \mu s$. In particular embodiments, an RC time constant of a circuit may be associated with a time for the circuit to respond to or recover from a transient input, such as for example a current or voltage pulse or step input. As an example and not by way of limitation, an RC time constant of a circuit may be approximately equal to an amount of time for the circuit to respond to a step input (e.g., a step change in input voltage or current) by approximately $(1-e^{-1}) \cong 63\%$ of the difference between an initial and a final voltage or current value.

In the example of FIG. 5, circuit 50A includes an input capacitor C1 coupled in series to an input resistor R1, and input resistor R1 is in turn coupled to a parallel combination of diode D1 and bleed resistor R2. Input capacitor C1 is also coupled to conductive line 52, and conductive line 52 may be coupled to tip 26 or cap 27 of stylus 20 or a resistive or conductive portion of tip 26 or cap 27. In FIG. 5, the parallel combination of diode D1 and bleed resistor R2 are coupled to a ground 54. In particular embodiments, ground 54 may not be included in circuit 50, and electrical charge that accumulates in circuit 50 may be coupled to earth ground or a nearby structure or body (e.g., a human body holding stylus 20) that is in turn coupled to a ground reference potential. In FIG. 5, bleed resistor R2 in parallel with diode D1 provides a path for current to ground so circuit 50 may not become charged up with accumulated charge. In FIG. 5, input capacitor C1 along with input resistor R1 may act to limit current or voltage spikes from an ESD event. In particular embodiments, circuit 50 may be disposed on a printed-circuit board (PCB) or a FPC. In particular embodiments, circuit 50 may include discrete circuit elements coupled together (e.g., coupled together with solder) without a PCB or FPC. Although this disclosure describes and illustrates particular circuits that include particular circuit elements coupled in particular configurations, this disclosure contemplates any suitable circuits that include any suitable circuit elements coupled in any suitable configurations.

FIG. 6 illustrates another example circuit 50B for producing an asymmetric electronic response from stylus 20. As illustrated in the example circuit 50B of FIG. 6, circuit 50B does not include an input capacitor. In particular embodiments, circuit 50 may not include an input capacitor. Diode D1 in circuit 50A has a reverse orientation with respect to diode D1 in circuit 50B. In FIG. 5, the anode of diode D1 is coupled to input resistor R1, and the cathode of diode D1 is coupled to ground 54. In FIG. 6, the cathode of diode D1 is coupled to input resistor R1, and the anode of diode D1 is coupled to ground 54. In particular embodiments, diode D1 may be oriented in any suitable direction in an asymmetric electronic response circuit 50. In particular embodiments, diode D1 in circuit 50A may produce an asymmetric electronic response that is the reverse of the asymmetric electronic response produced by diode D1 in circuit 50B.

In FIG. 6, switch SW1 in example circuit 50B is coupled to the two ends of diode D1 as well as to the two ends of bleed resistor R2. In particular embodiments and as described above, switch SW1 may be a switch 30 integrated with outer body 22 of stylus 20. In FIG. 6, switch SW1 is in the open (or off) position, and circuit 50B may exhibit an asymmetric electronic response. When switch SW1 is in the closed (or on) position, diode D1 is electrically shorted and effectively removed from operating in circuit 50B, and circuit 50B may not exhibit an asymmetric electronic response. When switch SW1 is closed, circuit 50B may exhibit a symmetric electronic response that may be associated with a stylus having symmetric electronic characteristics. In particular embodiments, a switch 30 disposed on outer body 22 of stylus 20 may be used to select between two modes of stylus operation, asymmetric and symmetric. In particular embodiments, device 42 may determine whether stylus 20 is exhibiting an asymmetric or symmetric response, and device 42 may alter the functionality of stylus 20 depending on the response of stylus 20. In particular embodiments, switch SW1 may be a normally open momentary switch, a normally closed momentary switch, a latching switch, or any suitable switch. In particular embodiments switch SW1 may be a single-pole, single-throw switch with two leads. In particular embodiments, one lead of switch SW1 may be coupled between an end of diode D1 and ground 54, and the other lead of switch SW1 may be coupled between an end of resistor R1 and conductive line. Although this disclosure describes and illustrates particular switches coupled to particular circuit elements, this disclosure contemplates any suitable switches coupled to any suitable circuit elements.

In FIGS. 5 and 6, diode D1 may provide for an asymmetric response of circuit 50 to an applied or induced voltage or current. In particular embodiments, circuit 50 may include any suitable circuit element that provides an asymmetric electrical response, such as for example one or more diodes or one or more transistors. This disclosure contemplates any suitable means for providing an asymmetric electrical response. In particular embodiments, a pulsed or alternating voltage applied to touch sensor 10 drive electrode may induce an input current, $I_{STYLUS}$, to flow through circuit 50 of stylus 20 when stylus 20 is in contact with or comes within proximity of touch sensor 10 surface. In FIG. 5, for a positive $I_{STYLUS}$ value (e.g., current flowing into circuit 50A), diode D1 may be turned on (or, in a forward-biased state). For a positive $I_{STYLUS}$, most of the $I_{STYLUS}$ current will flow through the low-impedance path of diode D1, and relatively little of the $I_{STYLUS}$ current will flow through bleed resistor R2. In FIG. 5, for a negative $I_{STYLUS}$ value (e.g., current flowing out of circuit 50A), diode D1 may be turned off (or, in a reverse-biased state), and most of the $I_{STYLUS}$ current will flow through bleed resistor R2. In FIG. 6, since diode D1 is reversed relative to FIG. 5, the behavior of diode D1 is similarly reversed so that for a positive $I_{STYLUS}$ value, diode D1 may be turned off, and most current will flow through bleed resistor R2. Similarly, for a negative $I_{STYLUS}$ value, diode D1 in circuit 50B may be turned on, and most of the $I_{STYLUS}$ current will flow through diode D1. Although this disclosure describes and illustrates particular circuits with particular circuit elements that provide particular asymmetric electrical responses, this disclosure contemplates any suitable circuits with any suitable circuit elements that provide any suitable asymmetric electrical responses.

In FIG. 5, as an example and not by way of limitation, capacitor C1 may have a value of 5 pF, resistor R1 may have a value of 100 kΩ (or, 100 kiloohms), and bleed resistor R2 may have a value of 1000 kΩ (or, 1 megaohm). In FIG. 5, a positive polarity input (e.g., a positive or rising voltage step) applied to touch sensor 10 drive electrode may induce at conductive line 52 a positive input current $I_{STYLUS}$ through capacitive coupling between the drive electrode and conductive line 52. For a positive input current, diode D1 may be turned on, and for the purpose of analyzing circuit 50A, since relatively little current flows through R2, bleed resistor R2 may be treated as if it were disconnected from circuit 50A. In FIG. 5, a time constant ($\tau_+$) associated with a positive input current to circuit 50A may be found from the expression $\tau_+=R\times C=(100\ k\Omega)\times(5\ pF)=0.5\ \mu s$. Conversely, in FIG. 5, a negative polarity input (e.g., a negative or falling voltage step) applied to touch sensor 10 drive electrode may induce at conductive line 52 a negative input current $I_{STYLUS}$. For a negative input current, diode D1 may be turned off, and most of the current will flow through bleed resistor R2, giving circuit 50B a resistance of approximately $R=R_1+R_2=1100$ kΩ. In FIG. 5, a time constant ($\tau_-$) associated with a negative input current to circuit 50A may be found from the expression $\tau_-=R\times C=(1100\ k\Omega)\times(5\ pF)=5.5\ \mu s$. In the example of FIG. 5, circuit 50A may have a polarity-dependent time constant such that for a positive polarity input, circuit 50A has a time constant of approximately 0.5 μs, and for a negative polarity input, circuit 50A has a time constant of approximately 5.5 μs.

In particular embodiments, a time constant associated with circuit 50 may also depend on one or more other capacitances coupled to circuit 50, such as for example: a touch capacitance between stylus 20 and one or more electrodes of touch sensor 10, a capacitance associated with a connection between circuit 50 and ground 54, or a residual capacitance of diode D1. Similarly, in particular embodiments, a time constant associated with circuit 50 may also depend on one or more other resistances, such as for example a resistance of conductive line 52, a resistance of tip 26 or cap 27, or a resistance associated with a connection between circuit 50 and ground 54. In the example of FIG. 6, circuit 50B may not include a discrete capacitor like capacitor C1 in circuit 50A of FIG. 5. In FIG. 6, a time constant associated with circuit 50B may depend on one or more other capacitances coupled to circuit 50B as described above.

In FIGS. 5 and 6, circuit elements C1, R1, and R2 may have any suitable values. As an example and not by way of limitation, in FIG. 5, input capacitor may have a capacitance of 1 pF, 2 pF, 5 pF, 10 pF, or any suitable capacitance value. As another example and not by way of limitation, input resistor R1 in FIGS. 5 and 6 may have a resistance of 20 kΩ, 100 kΩ, 200 kΩ, or any suitable resistance value. As another example and not by way of limitation, bleed resistor R2 in FIGS. 5 and 6 may have a resistance of 500 kΩ, 1000 kΩ, 2000 kΩ, or any suitable resistance value. In particular embodiments, diode D1 may be a diode having low capacitance, such as for example a low-capacitance diode or a diode for radio-frequency (RF) applications. Although this disclosure describes and illustrates particular circuits with particular circuit elements having particular values, this disclosure contemplates any suitable circuits with any suitable circuit elements having any suitable values. Although this disclosure describes and illustrates particular circuits having particular time constants, this disclosure contemplates any suitable circuits having any suitable time constants.

Figure 7:
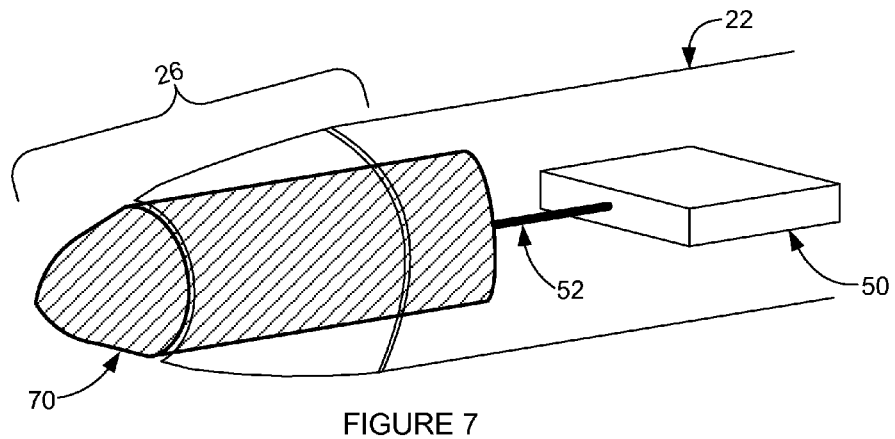
FIG. 7 illustrates a cutaway view of an example stylus showing an example circuit and an example tip.

FIG. 7 illustrates a cutaway view of an example stylus 20 showing an example circuit 50 and an example tip 26. In the example of FIG. 7, circuit 50 is located within outer body 22 of stylus 20 near tip 26. In particular embodiments, circuit 50 may be located within or near tip 26 or cap 27 of stylus 20. In particular embodiments, circuit 50 may be located at any suitable location within stylus 20. In particular embodiments, stylus 20 may include one circuit 50 located within or near tip 26 and coupled to a portion of tip 26 and another circuit 50 located within or near cap 27 and coupled to a portion of cap 27. In FIG. 7, circuit 50 is coupled to end portion 70 of tip 26 by conductive line 52. In particular embodiments, circuit 50 may be coupled to end portion 70 of tip 26 or cap 27 by conductive line 52. In particular embodiments, conductive line 52 may be a length of conductive wire, a part of a PCB or FPC, or a part of or an extension of circuit 50. In particular embodiments, circuit 50 may be attached directly to or coupled directly to end portion 70 without conductive line 52. In particular embodiments, circuit 50 may be integrated into tip end portion 70 without conductive line 52. In particular embodiments, end portion 70 may be made of an electrically conductive material, such as for example a conductive metal or a conductive form of plastic or rubber. In particular embodiments, end portion 70 may be made from a material that changes electrical resistance as a force is applied to the material. In particular embodiments, end portion 70 may be referred to as an electrically conductive element. In particular embodiments, end portion 70 may be coupled to conductive line 52, and end portion 70 and conductive line 52 may be referred to together as an electrically conductive element.

Figure 8:
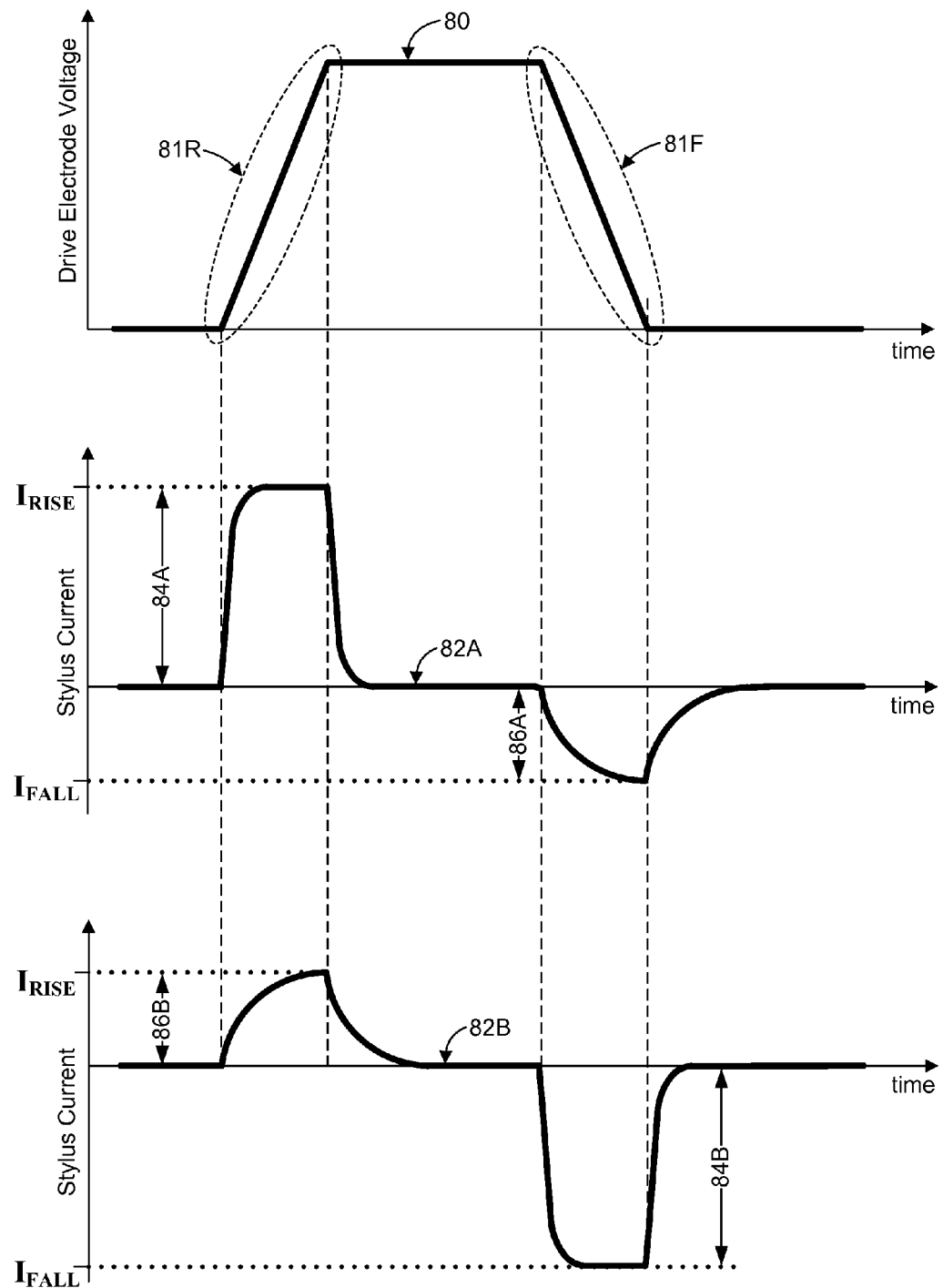
FIG. 8 illustrates an example electrode drive signal and two example stylus current signals.

FIG. 8 illustrates an example electrode drive signal 80 and two example stylus current signals 82A and 82B. In the example of FIG. 8, electrode drive signal 80 may represent a time-dependent voltage signal (or, drive signal) applied by device 42 to one or more drive electrodes of touch-sensitive area 44. In particular embodiments, drive signal 80 may be a periodic square-wave signal, a periodic square-wave signal with rising and falling edges having finite rise and fall times (as illustrated in FIG. 8), a sinusoidal signal, or any suitable periodic waveform or train of pulses for driving a touch-sensor drive electrode. In FIG. 8, electrode drive signal 80 includes a pulse with rising edge 81R and falling edge 81F. In FIG. 8, stylus current signals 82A and 82B may represent electric current $I_{STYLUS}$ in circuit 50 capacitively induced by electrode drive signal 80 when stylus 20 is in contact with or comes within proximity of touch-sensitive area 44. In particular embodiments, stylus current signals 82A and 82B may represent electric current $I_{STYLUS}$ in circuit 50 induced by electrode drive signal 80 where the current is induced through a capacitive coupling between one or more drive electrodes of touch-sensitive area 44 and a conductive element (e.g., end portion 70 or conductive line 52) of stylus 20. Current signal 82A in FIG. 8 may be associated with circuit 50A of FIG. 5, and current signal 82B may be associated with circuit 50B of FIG. 6.

In particular embodiments, when stylus 20 is in contact with or within proximity of the surface of touch-sensitive area 44, conductive line 52 or conductive end portion 70 may be capacitively coupled to one or more drive electrodes of touch-sensitive area 44. In particular embodiments, a drive signal applied to one or more drive electrodes of touch-sensitive area 44 may induce a current in circuit 50 of stylus 20 through the capacitive coupling between the one or more drive electrodes and conductive line 52 or conductive end portion 70. In particular embodiments, stylus current ($I_{STYLUS}$) 82 may be proportional to a first derivative with respect to time of electrode drive signal (V) 80, and the relationship between the two signals may be expressed as $$I_{STYLUS} = C_T \times \frac{dV}{dt},$$

where $C_T$ is a touch capacitance or coupling capacitance between drive electrodes of touch-sensitive area 44 and conductive line 52 or end portion 70. As examples and not by way of limitation, $C_T$ may have a value of 0.1 pF, 0.5 pF, 1 pF, 2 pF, 3 pF, or any suitable capacitance value. In particular embodiments, the value of $C_T$ may depend, at least in part, on how close tip 26, cap 27, or end portion 70 of stylus 20 is to touch-sensitive area 44.

In particular embodiments, the response of stylus current 82 to drive signal 80 may have some time delay or lag due to an RC time constant associated with circuit 50. The example stylus current signal 82A of FIG. 8 may be associated with example circuit 50A of FIG. 5. In FIG. 8, the rising (or positive) edge 81R of drive signal 80 induces a positive current transient in signal 82A with a magnitude of $I_{RISE}$ 84A. Similarly, the falling (or negative) edge 81F of drive signal 80 in FIG. 8 induces a negative current transient in signal 82A with a magnitude of $I_{FALL}$ 86A. In FIG. 8, the time constant ($\tau_+$) associated with the positive current transient of signal 82A is relatively fast when compared to the relatively slow time constant ($\tau_-$) associated with the negative current transient. As an example and not by way of limitation, for signal 82A, $\tau_+$ may be approximately 0.5 μs, and $\tau_-$ may be approximately 5 μs. In FIG. 8, the positive transient current magnitude $I_{RISE}$ 84A of signal 82A is larger than the magnitude of the negative current amplitude $I_{FALL}$ 86A. In particular embodiments, the response of stylus current 82A to drive signal 80 may be referred to as an asymmetric electronic response, where circuit 50A exhibits a polarity-dependent time constant and a polarity-dependent transient current response.

The example stylus current signal 82B of FIG. 8 may be associated with example circuit 50B of FIG. 6 where diode D1 is reversed relative to its orientation in circuit 50A of FIG. 5. Stylus current signal 82B exhibits positive and negative current transients with reversed timing and polarity relative to current signal 82A as a result of the reversed orientation of diode D1. In particular embodiments, the electrical response represented by signal 82B may be referred to as being substantially reversed relative to the electrical response represented by signal 82A. In FIG. 8, the rising edge 81R of drive signal 80 induces a positive current transient in signal 82B with a magnitude of $I_{RISE}$ 86B. Similarly, the falling edge 81F of drive signal 80 induces a negative current transient in signal 82B with a magnitude of $I_{FALL}$ 84B. In FIG. 8, the time constant ($\tau_+$) associated with the positive current transient of signal 82B is relatively slow when compared to the relatively fast time constant ($\tau_-$) associated with the negative current transient. As an example and not by way of limitation, for signal 82B, $\tau_+$ may be approximately 5 μs, and $\tau_-$ may be approximately 0.5 μs. The positive transient current magnitude $I_{RISE}$ 86B of signal 82B is smaller than the magnitude of the negative current magnitude $I_{FALL}$ 84B. In particular embodiments, the response of stylus current 82B to drive signal 80 may be referred to as an asymmetric electronic response, where circuit 50B exhibits a polarity-dependent time constant and a polarity-dependent transient current response.

Figure 10:
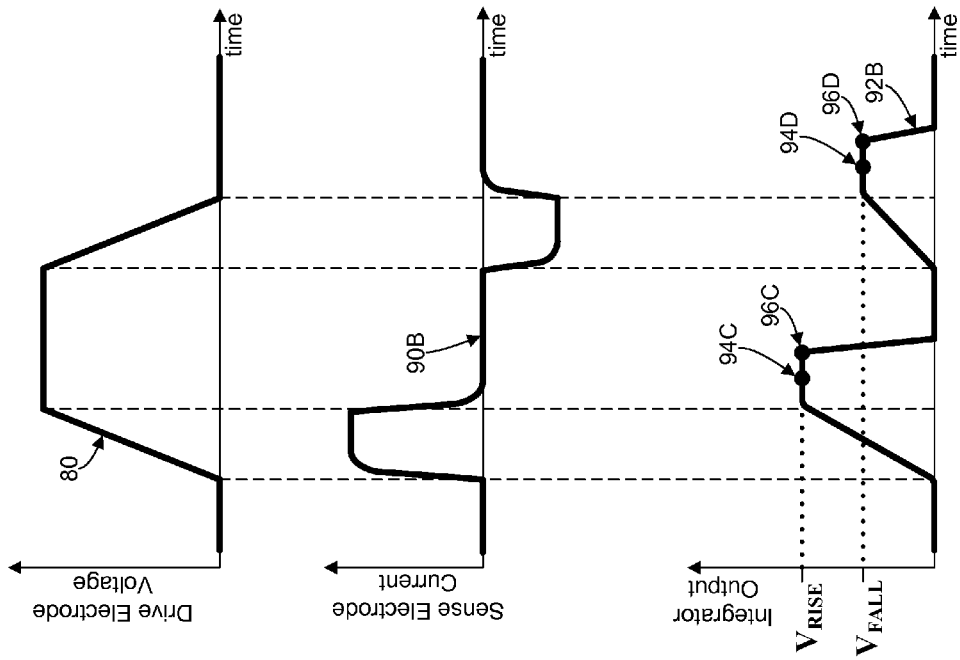
FIGS. 9-10 illustrate example signals of a device or a touch-sensitive area of a device in the presence of a stylus with asymmetric electronic characteristics.
Figure 9:
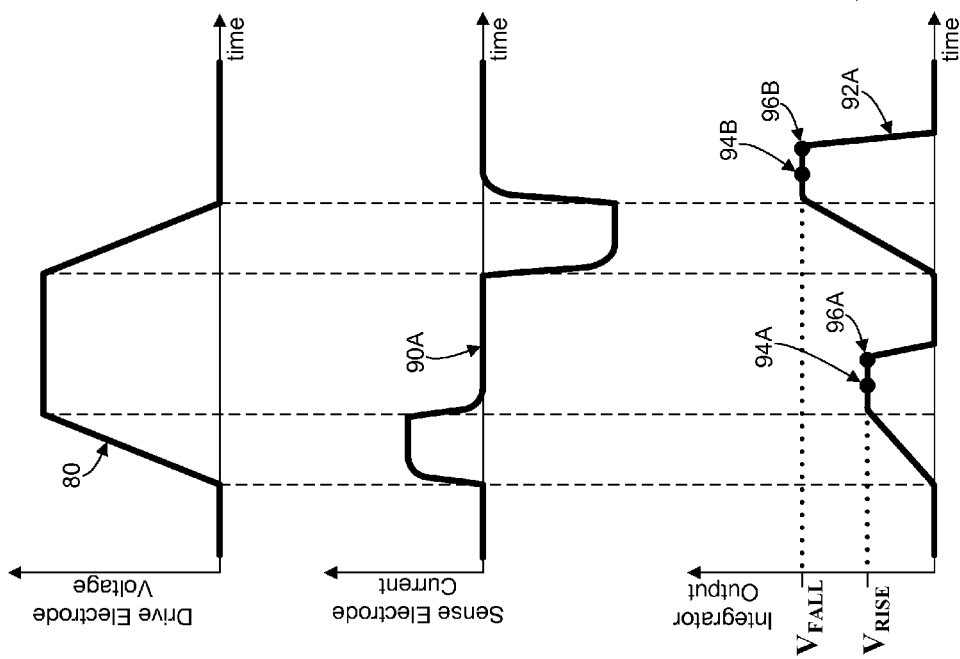

FIGS. 9-10 illustrate example signals of device 42 or touch-sensitive area 44 in the presence of a stylus 20 with asymmetric electronic characteristics. In FIGS. 9-10, the upper signal, drive electrode voltage 80, corresponds to an electrode drive signal 80 similar to that described above for FIG. 8. In FIGS. 9-10, the middle signal, sense electrode current 90, corresponds to a current induced in a sense electrode of touch-sensitive area 44 by drive signal 80. In FIGS. 9-10, drive electrode signal 80 and sense electrode current 90 may be associated with a touch sensor operating in a mutual-capacitance implementation. In particular embodiments, a drive electrode and a sense electrode may be capacitively coupled, and drive signal 80 applied to a drive electrode may induce a sense electrode current 90 through the capacitive coupling between the electrodes. FIG. 9 may be associated with stylus 20 having circuit 50A of FIG. 5 and a stylus current response 82A of FIG. 8. FIG. 10 may be associated with stylus 20 having circuit 50B of FIG. 6 and a stylus current response 82B of FIG. 8. In particular embodiments, the sense-electrode signal represented by signal 90A may be referred to as being substantially reversed relative to the sense-electrode signal represented by signal 90B.

In FIGS. 9-10, the bottom signal, integrator output 92, corresponds to a voltage signal obtained by integration of sense electrode current signal 90. In particular embodiments, sense electrode current 90 may be coupled to an electronic integrator circuit in device 42 that integrates or sums the electric charge in sense electrode current signal 90 and produces a proportional output voltage. This disclosure contemplates any suitable integrator circuit, such as for example a digital integrator or an analog integrator that includes an operational amplifier with a feedback capacitor. In particular embodiments, an integrator circuit may provide an output voltage signal that is proportional to sense electrode current signal 90 integrated over a particular time interval. In particular embodiments, an integrator circuit may provide an output voltage signal that is proportional to sense electrode current signal 90 integrated over a time interval approximately corresponding to a rising or falling edge of electrode drive signal 80.

In FIG. 9, drive signal 80 induces sense electrode current 90A with a relatively small positive current transient and a relatively large negative current transient. The relatively large positive stylus current transient 84A of FIG. 8 induced by drive signal 80 may be viewed as effectively "stealing" or shunting electric field or charge away from the sense electrode of touch-sensitive area 44, thus reducing the magnitude of the induced positive sense electrode current. Conversely, the relatively small negative stylus current transient 86A steals less electric field or charge away from the sense electrode, and so the magnitude of the corresponding induced negative sense electrode current in FIG. 9 is larger than the induced positive sense electrode current. In particular embodiments, an imbalance or difference between induced positive and negative sense electrode currents may be related, at least in part, to stylus 20 having asymmetric electronic characteristics.

In particular embodiments, an integrator circuit may accumulate charge from sense electrode current signal 90A, resulting in integrator output signal 92A. In particular embodiments, an integrator circuit may accumulate charge over a duration approximately equal to a positive edge 81R of drive signal 80, and the integrator circuit may separately accumulate charge during a negative edge 81F of drive signal 80. In FIG. 9, integrator output signal 92A reaches a voltage level of $V_{RISE}$, and device 42 may sample or measure voltage level $V_{RISE}$ at point 94A. In particular embodiments, sampling or measurement of a voltage level may include an analog-to-digital conversion. After $V_{RISE}$ is sampled, the integrator circuit may be reset at point 96A, and the integrator may then be ready to accumulate charge associated with the negative edge 81F of drive signal 80. In particular embodiments, the sign of the integrator circuit may be flipped when accumulating charge associated with a negative sense electrode current signal 90A, and the integrator circuit may then output a positive voltage. In FIG. 9, integrator output signal 92A reaches a voltage level of $V_{FALL}$, and device may sample voltage level $V_{FALL}$ at point 94B and reset the integrator at point 96B. In FIG. 9, voltage level $V_{FALL}$, corresponding to a negative edge 81F of drive signal 80, is larger than voltage level $V_{RISE}$, corresponding to a positive edge 81R of drive signal 80. In particular embodiments, based on the relative values of $V_{RISE}$ and $V_{FALL}$, device 42 may determine whether stylus 20 with asymmetric electronic characteristics is interacting with touch-sensitive area 44.

Sense electrode current 90A and integrator output signal 92A in FIG. 9 may be associated with stylus 20 interacting with touch-sensitive area 44, where stylus 20 includes circuit 50A with diode D1 oriented as illustrated in FIG. 5. Sense electrode current 90B and integrator output signal 92B in FIG. 10 may be associated with stylus 20 interacting with touch-sensitive area 44, where stylus 20 includes circuit 50B with diode D1 oriented as illustrated in FIG. 6 (e.g., diode D1 in FIG. 6 is reversed relative to its orientation in FIG. 5). In FIG. 10, charge from sense electrode current signal 90B may be integrated and sampled in a manner similar to FIG. 9. In FIG. 10, transients of sense electrode current 90B are reversed relative to FIG. 9, and similarly, integrator output 92B in FIG. 10 is reversed relative to FIG. 9. In FIG. 10, integrator output signal 92B reaches a voltage level of $V_{RISE}$, corresponding to sense electrode current 90B induced by rising edge 81R of drive signal 80. Similarly, integrator output signal 92B reaches a voltage of $V_{FALL}$, corresponding to sense electrode current 90B induced by falling edge 81F of drive signal 80. In FIG. 10, voltage level $V_{RISE}$, corresponding to positive edge 81R of drive signal 80, is larger than voltage level $V_{FALL}$, corresponding to negative edge 81F of drive signal 80.

In the examples of FIGS. 9 and 10, a difference in values of $V_{RISE}$ and $V_{FALL}$ may by attributed, at least in part, to asymmetric electronic characteristics of stylus 20. In particular embodiments, if $V_{RISE} < V_{FALL}$ (as illustrated in FIG. 9) or $V_{RISE} > V_{FALL}$ (as illustrated in FIG. 10), device 42 may determine that stylus 20 with asymmetric electronic characteristics is interacting with touch-sensitive area 44. In particular embodiments, if $V_{RISE}$ and $V_{FALL}$ are approximately equal, device 42 may determine that an object, such as for example a finger or a stylus with symmetric electronic characteristics, is interacting with touch-sensitive area 44. In particular embodiments, $V_{RISE} < V_{FALL}$ may indicate a stylus with a circuit similar to circuit 50A of FIG. 5 is interacting with touch-sensitive area 44, and $V_{RISE} > V_{FALL}$ may indicate a stylus with a circuit similar to circuit 50B of FIG. 6 is interacting with touch-sensitive area 44. As an example and not by way of limitation, if $V_{RISE}$ and $V_{FALL}$ differ by less than approximately 2%, then device 42 may determine that an object, such as for example a finger or a stylus with symmetric electronic characteristics, is interacting with touch-sensitive area 44. As another example, if $V_{RISE}$ and $V_{FALL}$ differ by more than approximately 2%, then device may determine that stylus 20 with asymmetric electronic characteristics is interacting with touch-sensitive area 44. In particular embodiments, a difference between $V_{RISE}$ and $V_{FALL}$ of 1%, 2%, 5%, 10%, or any suitable value may indicate a stylus 20 with asymmetric electronic characteristics is interacting with touch-sensitive area 44.

In particular embodiments, stylus 20 may have a circuit similar to circuit 50A in tip 26 and a circuit similar to circuit 50B in cap 27 so that diode D1 in tip 26 is oriented with the opposite polarity of diode D1 in cap 27. In particular embodiments, device 42 may determine whether tip 26, cap 27, or some other object (e.g., a finger) is interacting with touch-sensitive area 44. In particular embodiments, device 42 may modify a function of device 42 in response to a determination that tip 26, cap 27, or some other object is interacting with touch-sensitive area 44. As an example and not by way of limitation, device 42 may be configured so that stylus 20 may write on or enter information into a display of device 42 in response to a determination by device 42 that tip 26 is interacting with touch-sensitive area 44. As another example, device 42 may be configured so that stylus may erase or remove information from a display of device 42 in response to a determination by device 42 that cap 27 is interacting with touch-sensitive area 44. In particular embodiments, if $V_{RISE} < V_{FALL}$, device 42 may determine that tip 26 of stylus 20 is interacting with touch-sensitive area 44. In particular embodiments, if $V_{RISE} > V_{FALL}$, device 42 may determine that cap 27 of stylus 20 is interacting with touch-sensitive area 44. In particular embodiments, if $V_{RISE} \approx V_{FALL}$, device 42 may determine that an object (e.g., a finger) other than stylus 20 with asymmetric electronic characteristics is interacting with touch-sensitive area 44. In particular embodiments, stylus 20 may include tip 26 with a symmetric electronic response (e.g., tip 26 may include a conductive material without an asymmetric-response circuit 50) and cap 27 with a circuit 50 that provides an asymmetric response to an electrode drive signal 80. In particular embodiments, cap 27 may include an asymmetric circuit 50 coupled to conductive rubber end portion 70, and conductive rubber end portion 70 may have a cylindrical shape with a substantially flat end and a diameter of approximately 3 mm, 5 mm, 8 mm, or any suitable diameter. Although this disclosure describes and illustrates particular styluses 20 having particular tips 26 and caps 27 with particular circuits and made of particular materials, this disclosure contemplates any suitable styluses having any suitable tips and caps with any suitable circuits and made of any suitable materials.

In particular embodiments, stylus 20 may include circuit 50 coupled to tip 26 or cap 27, and tip 26 or cap 27 may include a material that changes electrical resistance as a force is applied it. Applying a force to tip 26 or cap 27, such as for example by pressing tip 26 or cap 27 against a surface of touch-sensitive area 44, may cause a resistance associated with circuit 50 to change depending on the amount of force applied. As the resistance associated with circuit 50 changes, the time constants $\tau_+$ and $\tau_-$ associated with circuit 50 may also change, causing a corresponding change in stylus current 82, sense electrode current 90, and integrator output voltages $V_{RISE}$ and $V_{FALL}$. In particular embodiments, device 42 may determine an amount of force applied to tip 26 or cap 27 by determining an amount of change in $V_{RISE}$ or $V_{FALL}$. In particular embodiments, device 42 may modify a function of device 42 in response to a force applied to tip 26 or cap 27 of stylus 20. As an example and not by way of limitation, device 42 may be configured to display one or more lines or shapes drawn by stylus 20 on touch-sensitive area 44, and as force applied to tip 26 or cap 27 increases, a property of the displayed line may change (e.g., line width may increase or line color may change).

Herein, reference to a computer-readable non-transitory storage medium or media may include one or more semiconductor-based or other integrated circuits (ICs) (such, as for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A first device comprising:
   a first electrically conductive element that is configured to:
      capacitively couple to an electrode of a second device emitting a first electrical signal; and
      communicate to a first circuit of the first device a second electrical signal induced in the first electrically conductive element by the first electrical signal and through the capacitive coupling; and
   the first circuit, coupled to the first electrically conductive element and configured to:
      receive the second electrical signal; and
      produce an electrical response to the second electrical signal, wherein the electrical response of the first circuit is based at least in part on one or more characteristics of the first electrical signal, wherein:
         the characteristics of the first electrical signal comprise a rising edge and a falling edge;
         the rising edge produces in the first circuit an electrical current transient having a first polarity, the first-polarity electrical current transient having an associated first current magnitude;
         the falling edge produces in the first circuit an electrical current transient having a second polarity opposite the first polarity, the second-polarity electrical current transient having an associated second current magnitude; and
         the first and second current magnitudes are different.

2. The first device of claim 1, wherein the first polarity is positive and the second polarity is negative.

3. The first device of claim 1, wherein:
   the first device is a passive stylus comprising a tip at an end of the stylus;
   the first electrically conductive element is disposed on or in the tip;
   the second device comprises a capacitive touch sensor;
   the electrode is a drive electrode of the capacitive touch sensor; and
   the first electrical signal is produced by a drive signal applied to the drive electrode.

4. The first device of claim 3, further comprising:
   a second electrically conductive element disposed on or in a cap at another end of the stylus opposite the tip end, wherein the second electrically conductive element is configured to:
      capacitively couple to the drive electrode of the capacitive touch sensor emitting the first electrical signal; and
      communicate to a second circuit of the stylus a third electrical signal induced in the second electrically conductive element by the first electrical signal and through the capacitive coupling between the drive electrode and the second electrically conductive element; and
   the second circuit, coupled to the second electrically conductive element and configured to:
      receive the third electrical signal; and
      produce an electrical response to the third electrical signal, wherein the electrical response of the second circuit to the third electrical signal is substantially reversed relative to the electrical response of the first circuit to the second electrical signal.

5. The first device of claim 1, wherein:
the first-polarity electrical current transient has an associated first time constant;
the second-polarity electrical current transient has an associated second time constant; and
the first and second time constants are different.

6. The first device of claim 5, wherein:
the first time constant is less than the second time constant;
the first current magnitude is greater than the second current magnitude;
the rising edge of the first electrical signal induces a positive electrical current transient in a sense electrode of the second device, the positive sense electrode current transient having a positive sense electrode current magnitude;
the falling edge of the first electrical signal induces a negative electrical current transient in the sense electrode of the second device, the negative sense electrode current transient having a negative sense electrode current magnitude; and
the positive sense electrode current magnitude is less than the negative sense electrode current magnitude.

7. The first device of claim 1, wherein the first circuit comprises:
a diode and a bleed resistor, the diode and bleed resistor coupled to one another in parallel, the diode comprising an anode and a cathode; and
an input resistor having a first end coupled to the first electrically conductive element and a second end coupled to the anode or the cathode of the diode.

8. The first device of claim 7, wherein:
the diode is a low-capacitance diode;
the input resistor has a value of approximately 100 kiloohms; and
the bleed resistor has a value of approximately 1 megaohm.

9. The first device of claim 7, wherein:
the first circuit further comprises a switch coupled to the anode and cathode of the diode; and
when the switch is closed, the diode is electrically shorted.

10. The first device of claim 7, wherein the second end of the input resistor is coupled to the anode of the diode, and further comprising:
a second electrically conductive element; and
a second circuit comprising:
a second diode and a second bleed resistor, the second diode and second bleed resistor coupled to one another in parallel, the second diode comprising an anode and a cathode; and
a second input resistor having a first end coupled to the second electrically conductive element and a second end coupled to the cathode of the second diode.

11. The first device of claim 1, wherein the first electrically conductive element comprises a material having an electrical resistance that changes as a force is applied to the material.

12. A first device comprising:
first means for:
capacitively coupling to an electrode of a second device emitting a first electrical signal; and
communicating to a second means of the first device a second electrical signal induced in the first means by the first electrical signal and through the capacitive coupling; and
the second means, for:
receiving the second electrical signal; and
producing an electrical response to the second electrical signal, wherein the electrical response of the second means is based at least in part on one or more characteristics of the first electrical signal, wherein:
the characteristics of the first electrical signal comprise a rising edge and a falling edge;
the rising edge produces in the second means an electrical current transient having a first polarity, the first-polarity electrical current transient having an associated first current magnitude;
the falling edge produces in the second means an electrical current transient having a second polarity opposite the first polarity, the second-polarity electrical current transient having an associated second current magnitude; and
the first and second current magnitudes are different.

13. The first device of claim 12, wherein the first polarity is positive and the second polarity is negative.

14. The first device of claim 12, wherein:
the first device is a passive stylus comprising a tip at an end of the stylus;
the first means is disposed on or in the tip;
the second device comprises a capacitive touch sensor;
the electrode is a drive electrode of the capacitive touch sensor; and
the first electrical signal is produced by a drive signal applied to the drive electrode.

15. The first device of claim 14, further comprising:
a third means disposed on or in a cap at another end of the stylus opposite the tip end, the third means for:
capacitively coupling to the drive electrode of the capacitive touch sensor emitting the first electrical signal; and
communicating to a fourth means of the stylus a third electrical signal induced in the third means by the first electrical signal and through the capacitive coupling between
the drive electrode and the third means; and
the fourth means, for:
receiving the third electrical signal; and
producing an electrical response to the third electrical signal, wherein the electrical response of the fourth means to the third electrical signal is substantially reversed relative to the electrical response of the second means to the second electrical signal.

16. The first device of claim 12, wherein:
the first-polarity electrical current transient has an associated first time constant;
the second-polarity electrical current transient has an associated second time constant;
the first and second time constants are different.

17. The first device of claim 16, wherein:
the first time constant is less than the second time constant;
the first current magnitude is greater than the second current magnitude;
the rising edge of the first electrical signal induces a positive electrical current transient in a sense electrode of the second device, the positive sense electrode current transient having a positive sense electrode current magnitude;
the falling edge of the first electrical signal induces a negative electrical current transient in the sense electrode of the second device, the negative sense electrode current transient having a negative sense electrode current magnitude; and
the positive sense electrode current magnitude is less than the negative sense electrode current magnitude.

18. The first device of claim 12, wherein the second means comprises:

a diode and a bleed resistor, the diode and bleed resistor coupled to one another in parallel, the diode comprising an anode and a cathode; and an input resistor having a first end coupled to the electrically conductive element and a second end coupled to the anode or the cathode of the diode.

19. The first device of claim 18, wherein:

the second means further comprises a switch coupled to the anode and cathode of the diode; and when the switch is closed, the diode is electrically shorted.

20. The first device of claim 12, wherein the first means comprises a material having an electrical resistance that changes as a force is applied to the material.

* * * * *